Oct. 3, 1933.  T. T. LOGIE  1,928,729
HOOD CATCH
Filed March 28, 1932  3 Sheets-Sheet 3
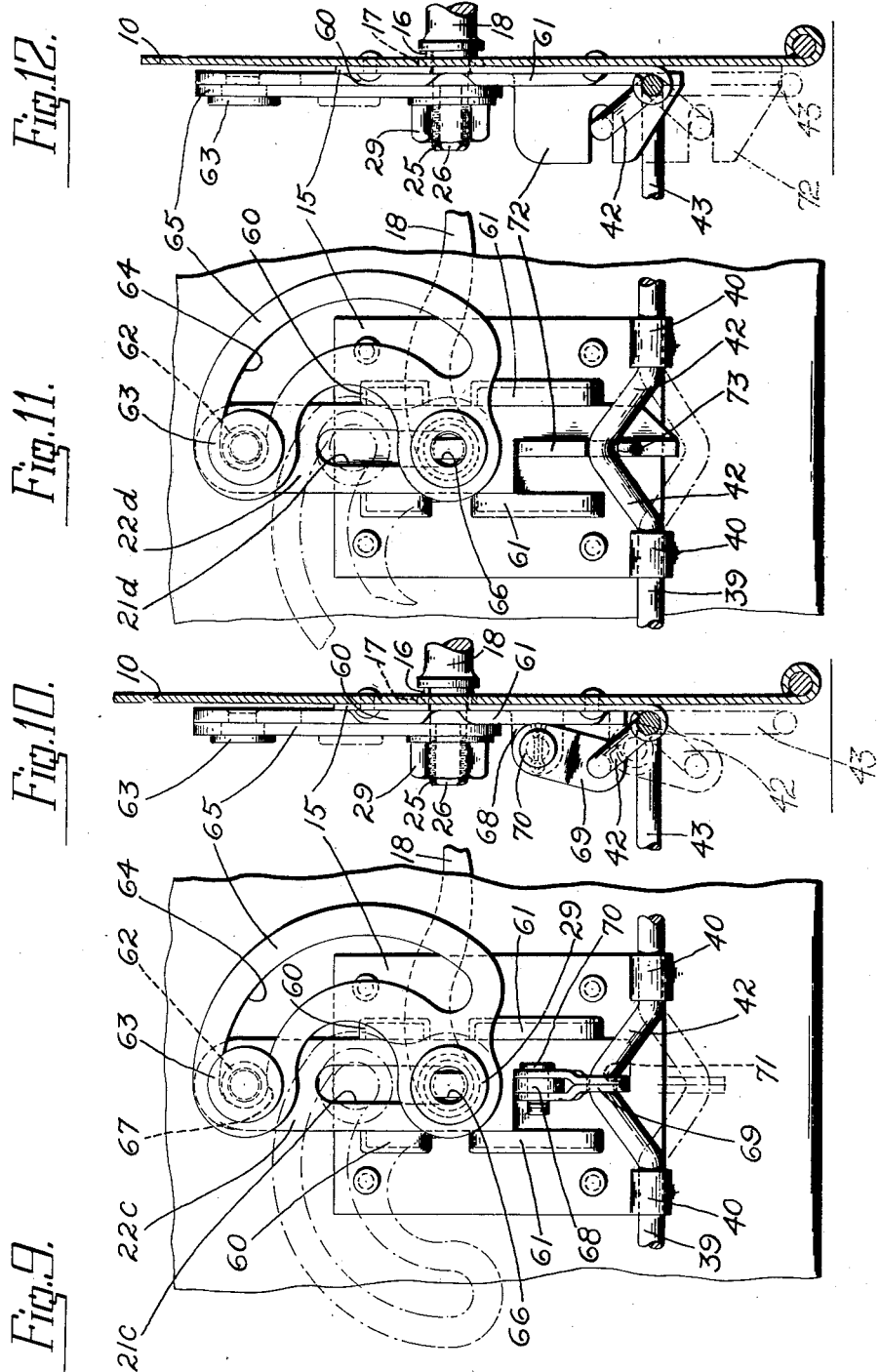
Inventor
THOMAS T. LOGIE
By
Attorney Patented Oct. 3, 1933

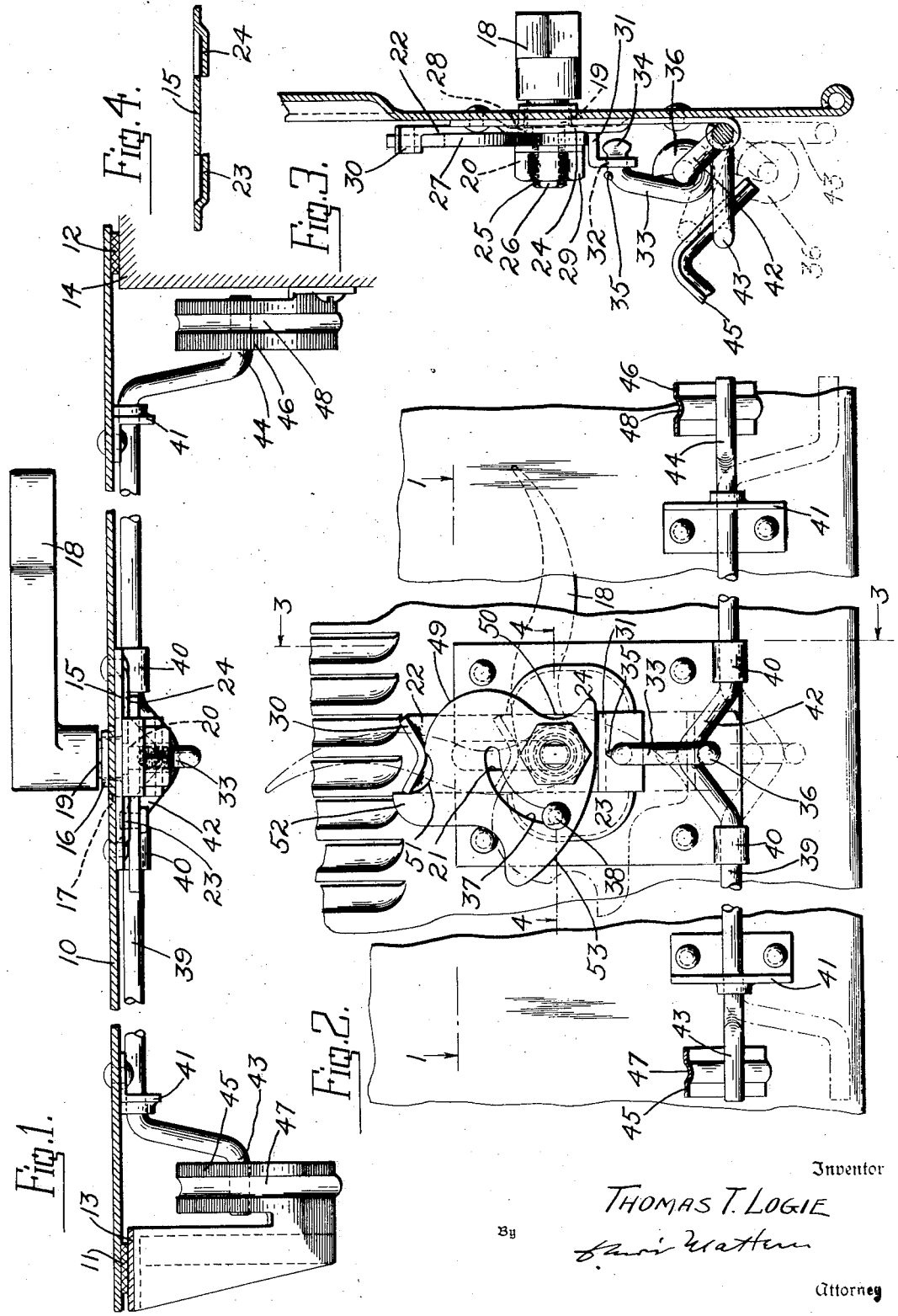

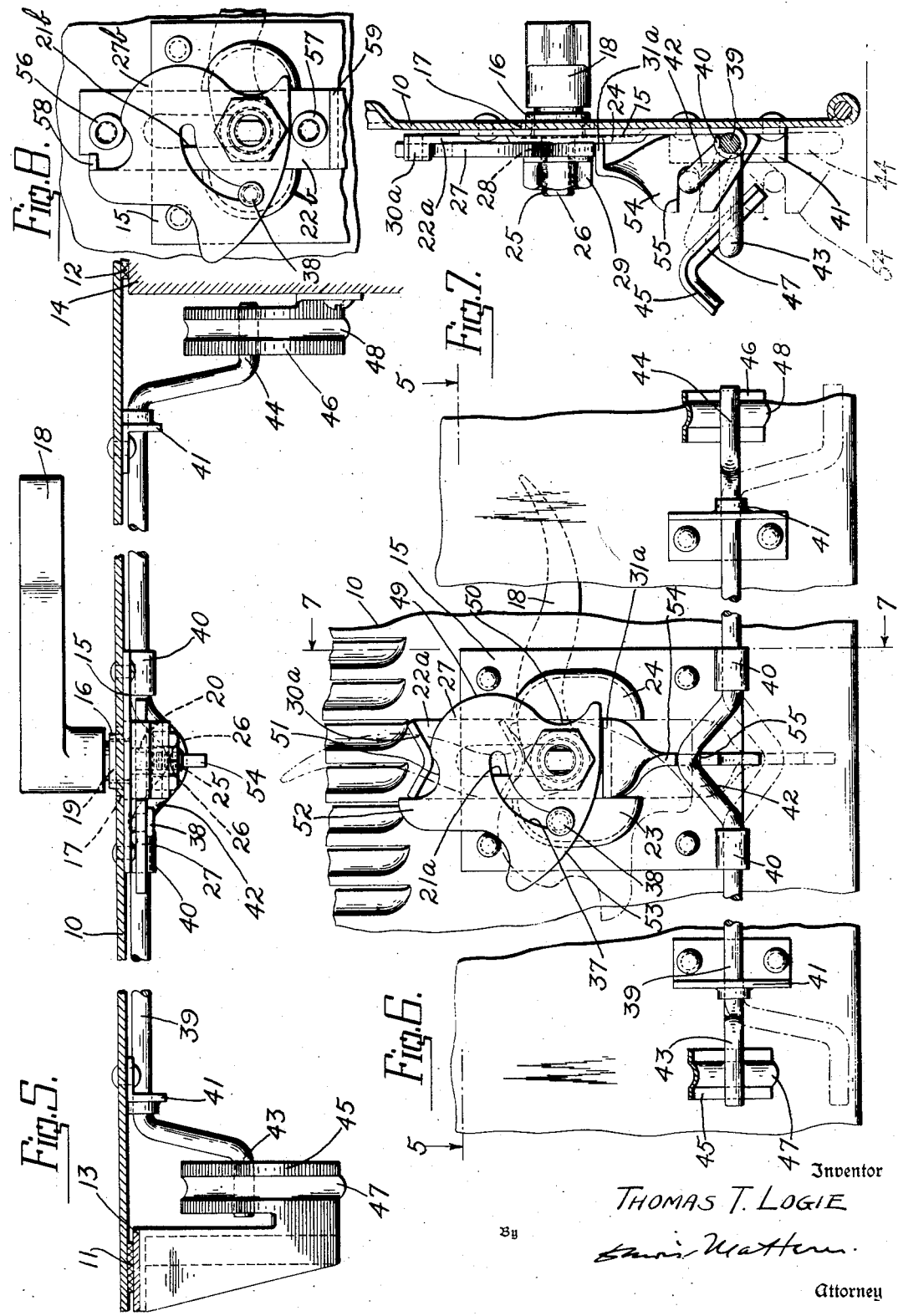

1,928,729

UNITED STATES PATENT OFFICE 1,928,729

HOOD CATCH

Thomas T. Logie, Bridgeport, Conn., assignor to The Bassick Company, Bridgeport, Conn., a corporation of Connecticut Application March 28, 1932. Serial No. 601,552

9 Claims. (Cl. 292—214)

The present invention relates to improvements in hood catches, particularly of the type in which rock shaft means is provided interiorly of the hood for engagement near the ends of the hood with keeper brackets secured to the chassis, the rock-shaft means being actuated by an operating handle arranged exteriorly and at a central or intermediate point upon the hood. An object of the invention is to provide improved actuating means, which will be of simple and compact construction, may be operated with facility, and will be highly efficient and reliable in use. To this end, it is proposed in the present exemplary embodiment of the invention to provide a vertically movable cam actuated movement translating slide member disposed in close parallel relation to the hood for imparting rotary movement to the rock-shaft, the arrangement being such that the force applied to the rock-shaft is at all times in a plane at right angles to the axis of rotation of the rock-shaft.

Another object is to provide an actuating means which may be operated by a 90° swing of the operating handle, and in which substantially this whole swing will be utilized for rotating and tensioning the rock-shaft, with a minimum of movement for locking or detenting in the operative position.

With the above and other objects in view, embodiments of the invention are shown in the accompanying drawings, and this embodiment will be hereinafter more fully described with reference thereto, and the invention will be finally pointed out in the claims.

In the drawings:

Fig. 1 is a horizontal sectional view through the hood and frame along the line 1—1 of Fig. 2, and showing the catch in plan, the same being in its operative position, and intermediate portions of the hood and rock-shaft being broken away.

Fig. 2 is an interior elevation also in operative position, and showing the inoperative position in dotted lines.

Fig. 3 is a vertical sectional view taken along the line 3—3 of Fig. 2.

Fig. 4 is a horizontal sectional view of the bracket plate employed, being taken along the line 4—4 of Fig. 2.

Fig. 5 is a horizontal sectional view through the hood and frame, along the line 5—5 of Fig. 6, and showing a modified form of catch in plan, the same being in its operative position, and intermediate portions of the hood and rock-shaft being broken away.

Fig. 6 is an interior elevation, also in operative position, and showing the inoperative position in dotted lines.

Fig. 7 is a vertical sectional view taken along the line 7—7 of Fig. 2.

Fig. 8 is an interior elevation of a modified form of slide.

Fig. 9 is an interior elevation of a further modified form of the invention, and shown in operative position, the keeper engaging ends of the rock shaft not being shown.

Fig. 10 is a vertical sectional view, taken along the line 10—10 of Fig. 9.

Fig. 11 is an interior elevation of a still further modified form of the invention, the keeper engaging ends of the rock shaft not being shown.

Fig. 12 is a vertical sectional view taken along the line 12—12 of Fig. 11.

Similar reference characters indicate corresponding parts throughout the several figures of the drawings.

Referring to the drawings, the automobile hood 10 is adapted to close in the usual manner against the lacings 11 and 12 of the radiator frame 13 and cowl portion 14 of the chassis.

Upon the inner face of the hood and preferably at a central point between the hood ends, there is riveted, or otherwise suitably secured, a bracket plate 15 having an outwardly flanged bearing aperture 16 in axial alignment with and having its flange engaged in a slightly larger aperture 17 in the hood.

The handle 18 is provided with a reduced diameter shank portion 19, which is journaled in said aperture 16, and has a further reduced inwardly extending portion 20, engaged in a vertical slot 21 provided in the slide member 22, which is mounted for vertical sliding movement on the plate 15 between a pair of pressed up guide bosses 23 and 24. The parallel slide engaging edges of these bosses are cut or lanced from the plate, as clearly shown in Fig. 4, to provide suitable guide surfaces for the slide.

The shank is threaded at its inner end portion, as at 25, and flats 26—26 are provided on this threaded portion, the shoulders formed by these flats being adjacent the slide 22. A cam member 27 is engaged upon this flattened portion of the shank, being provided with a non-circular opening 28 adapted to fit snugly thereon and being rigidly secured by a nut 29. The shoulders of the flats 26—26, against which the cam is abutted, are slightly clear of the slide 22, so that the latter is free to move vertically.

The slide is provided at its upper end with a

V-shaped flange 30 adapted to engage the periphery of the cam at the upper side and is provided beneath the cam with an outwardly bent right angular flange 31, the lower end of the slide being bent downwardly therefrom and provided with an aperture 32 in which is loosely engaged the upper angularly bent end of a link 33, this end being pinched out at each side of the slide, as at 34 and 35 to loosely retain it. The lower end of the link is provided with an eye 36 which connected it with the rock shaft, presently to be more fully referred to.

The handle 18 and cam 27 are adapted to be rotated 90°, being limited to such rotation by an arcuate slot 37 in the cam engaged by a headed pin 38 secured to the boss 23 of the bracket plate 15. The bosses 23 and 24 extend slightly above the surface of the slide to provide bearing surfaces for the cam.

The rock shaft 39, which extends longitudinal along the interior of the hood at each side of the bracket plate 15, is journaled in bearing brackets 40—40 bent from the lower edge of the bracket plate, and is also journaled near its outer ends in bearing brackets 41—41 secured interiorly upon the hood.

Between the bearing brackets 40—40 the rock-shaft is angularly bent to substantially V-form to provide a crank portion 42 which is engaged by the eye 36 of the link 33 to operatively connect the rock shaft to the slide 22.

The outer ends of the rock shaft are bent outwardly and longitudinally to provide offset crank ends 43 and 44, disposed parallel to the rock-shaft. The offset of these crank portions being relatively greater than that of the crank portion 42 and also being angularly offset with respect to said portion 42. The crank portions 43 and 44 are adapted to engage keeper brackets 45 and 46 suitably mounted on the radiator and cowl or upon any other convenient part of the chassis, in proximity to the hood ends. These brackets are illustrated as formed of sheet metal and their engaging faces, which are preferably disposed at an angle of about 45° are respectively provided with pressed out rounded ribs 47 and 48 for engagement by the crank ends 43 and 44 providing positive and firm engagement, irrespective of variations in the mounting and disposition of the parts.

The rock shaft is formed of a suitable spring metal, so that the crank ends 43 and 44 may be sprung to a different angular relation to the central crank portion 42 under the torsion and tensional effect of the rock-shaft. In the operative position, shown in full lines, with the crank ends 43 and 44 in engagement with the keeper brackets, this tension pulls downwardly on the slide 22, causing the flange 30 to be pressed tightly against the periphery of the cam 27 in a manner to hold the parts in operative position, and as will presently more fully appear.

The cam 27 has a lifting cam surface 49 having a recess 50 at its lower end in which the flange 30 seats in the inoperative position shown in dotted lines. Adjacent the high point there is provided a recess 51 having an abutment projection 52 at the opposed side from the high point of the cam surface 49, this point being so arranged in relation to the abutment that the latter engages the flange 30 just as the high point passes over the dead center, so that the point of the cam detents or drops into the recess 51, and under the downward pull of the slide the parts are thus held in operative position. A lowering cam surface 53 is provided upon the cam 27 in relation to engage the flange 31 to thus press the slide downwardly as the latch is released.

The operation is as follows:—

Swinging of the handle 18 from the inoperative position shown in dotted lines, to the operative position, shown in full lines, rotates the cam 27 causing the slide to be moved upwardly, and through the link connection with the crank portion 42 rotates the rock shaft 39, first bringing the crank ends 43 and 44 under and into engagement with the keeper brackets 45 and 46, whereupon they are sprung under tension as the movement of the handle is completed, the cam being retained in its operative position through engagement of the pointed flange 30 in the detent recess 51 just past the dead center. To disengage the catch the handle is turned in the opposite direction, being first turned with sufficient initial force to overcome the detenting pressure, and being then swung to a point where the recess 50 is engaged by the flange 30.

In Figs. 5 to 7 I have illustrated a modification in which the slide 22$^a$, having a vertical slot 21$^a$ and cam engaging flanges 30$^a$ and 31$^a$, is provided with a rigid extension 54 for connection with the rock shaft crank portion 42, instead of the link connection employed in the first embodiment. This extension is twisted into a plane at right angles to the body of the slide, and is provided with a slot 55 engaging the crank portion 42 and arranged at right angles to the sliding plane of the slide. The slot is open at one end to facilitate assembly, and is of such extent that as the slide moves between its upper and lower positions the crank portion 42 will remain in contact with the slot and be rotated.

In Fig. 8 I have shown a modified form of slide 22$^b$, having a vertical slot 21$^b$, and provided with upper and lower cam engaging rolls 56 and 57. A stop lug 58 is bent from the upper end of the slide for engaging the abutment portion 52 of the cam. The offset lower portion 59 of the slide is shown as broken away, and obviously may be connected to the crank portion 42 of the rock shaft by the link 33 as shown in Figs. 1 to 3 by a rigid extension 54 as shown in Figs. 5 to 7.

In Figs. 9 and 10 I have shown a modification in which a slide 22$^c$, having a vertical slot 21$^c$, engaged by the handle shaft, is guided for vertical movement upon the bracket plate 15 between upper and lower pairs of struck up guide bosses 23 and 24 of the first embodiment, but providing longer vertical bearing surfaces, because of the greater length of the slide 22$^c$. Upon the upper end of the slide a roller 62 is mounted on a flanged stud 63, and is engaged by the cam slot 64 of a cam arm 65, having a non-circular opening 66 at its hub portion, and secured upon the handle shaft 20 by the nut 29 in a similar manner to the first embodiment. The cam slot 64 is in the form of an arc, eccentrically disposed to the handle axis, and at its high end is provided with a slightly depressed portion 67 into which the roller 62 detents in the operative position. The flange of the stud 63 being wider than the cam slot retains the cam arm in close relation to the slide. At the lower end the slide is provided with a lug 68 bent outwardly therefrom at right angles, and to which a link member 69 is pivotally connected by a pin 70, the lower end of this link being provided with an aperture 71 engaged by the crank portion 42 of the rock shaft. The link member may be conveniently formed by bending a strip of sheet metal upon itself and spreading the end portions to engage at each side of the lug 68.

The operation is substantially similar to the first embodiment, so that a detail description of such operation is not deemed necessary.

In Figs. 11 and 12 I have shown a still further modification in which the slide 22$^d$, having a vertical slot 21$^a$, is provided with a rigid extension connecting it to the crank portion 42 of the rockshaft. This extension comprises a vertically disposed flange 72, bent at right angles from the slide along the central vertical line thereof, and is provided with a horizontal slot 73 engaged by the crank portion 42 of the rock shaft 39. The operation of this form of the invention is substantially similar to that of the embodiment shown in Figs. 5 to 7.

I have illustrated and described preferred and satisfactory embodiments of the invention, but it will be obvious that changes may be made therein, within the spirit and scope thereof as defined in the appended claims.

Having thus rescribed my invention, what I claim and desire to secure by Letters Patent is:—

1. A hood catch actuator, for operating keeper engaging catch means, comprising a movement translating slide operatively connected to said catch means, operating handle means rotatable about an axis transverse to the hood surface, and cam means carried by said handle means engaging said slide and adapted to move it relative to the hood and whereby said catch means is moved into and out of operative relation with said keeper.

2. A hood catch actuator, for operating keeper engaging catch means, comprising a movement translating slide having vertical rectilinear movement and operatively connected to said catch means, operating handle means rotatable about an axis transverse to the hood surface, and cam means carried by said handle means engaging said slide and adapted to move it relative to the hood and whereby said catch means is moved into and out of operative relation with said keeper.

3. A hood catch actuator, for operating keeper engaging catch means, comprising a movement translating slide having vertical rectilinear movement and operatively connected to said catch means, said slide having a vertical slot therein, operating handle means including a shank rotatable about an axis transverse to the hood surface and extended through said slot of the slide, and cam means carried by said shank engaging said slide and adapted to move it relative to the hood and whereby said catch means is moved into and out of operative relation with said keeper, said slide being disposed between said cam means and the hood.

4. A hood catch actuator, for operating keeper engaging catch means adapted for engaging said keeper means under tension, comprising a movement translating slide operatively connected to said catch means, operating handle means rotatable about an axis transverse to the hood surface, and cam means carried by said handle means engaging said slide and adapted to move it relative to the hood and whereby said catch means is moved into and out of operative relation with said keeper, said cam including an eccentric movement imparting portion, a stop portion adapted to limit the movement to a predetermined swing and a detenting portion for yieldably retaining the catch in operative position.

5. A hood catch actuator, for operating keeper engaging catch means adapted to swing about a horizontal axis parallel to the hood, comprising a movement translating slide having vertical rectilinear movement and operatively connected to said catch means, operating handle means rotatable about an axis transverse to the hood surface, and cam means carried by said handle means engaging said slide and adapted to move it in an up and down direction relative to the hood and whereby said catch means is moved into and out of operative relation with said keeper.

6. A hood catch actuator, for operating keeper engaging catch means adapted to swing about a horizontal axis parallel to the hood, comprising a movement translating slide having vertical rectilinear movement, a link pivotally connected to said slide and catch means and operatively connecting them, operating handle means rotatable about an axis transverse to the hood surface, and cam means carried by said handle means engaging said slide and adapted to move it in an up and down direction relative to the hood and whereby said catch means is moved into and out of operative relation with said keeper.

7. A hood catch actuator, for operating keeper engaging catch means adapted to swing about a horizontal axis parallel to the hood, comprising a movement translating slide having vertical rectilinear movement, an extension on said slide having a transverse slot operatively engaged with said catch means, operating handle means rotatable about an axis transverse to the hood surface, and cam means carried by said handle means engaging said slide and adapted to move it in an up and down direction relative to the hood and whereby said catch means is moved into and out of operative relation with said keeper.

8. A hood catch actuator, for operating keeper engaging catch means, comprising a movement translating slide having vertical rectilinear movement and operatively connected to said catch means, vertically spaced cam engaging abutments carried by said slide, operating handle means rotatable about an axis transverse to the hood surface, and cam means carried by said handle means engaging said spaced abutments of said slide and adapted to move it relative to the hood and whereby said catch means is moved into and out of operative relation with said keeper.

9. A hood catch actuator, for operating keeper engaging catch means, comprising a movement translating slide having vertical rectilinear movement and operatively connected to said catch means, operating handle means rotatable about an axis transverse to the hood surface, and cam means carried by said handle means having an eccentric cam slot engaging said slide and adapted to move it relative to the hood and whereby said catch means is moved into and out of operative relation with said keeper.

THOMAS T. LOGIE.